(12) United States Patent
Kim et al.

(10) Patent No.: US 12,482,644 B2
(45) Date of Patent: Nov. 25, 2025

(54) QUANTUM COMPUTER BASED ON MANIPULATION OF ION CHAINS

(71) Applicants: IonQ, Inc., College Park, MD (US); Duke University, Durham, NC (US)

(72) Inventors: Jungsang Kim, Chapel Hill, NC (US); Jonathan Albert Mizrahi, Silver Spring, MD (US); Jason Madjdi Amini, Takoma Park, MD (US); Kenneth Wright, Berwyn Heights, MD (US); Neal Pisenti, Laurel, MD (US); Hermann Uys, Annapolis, MD (US); Ming Li, Takoma Park, MD (US); Michael Lurie Goldman, Annapolis, MD (US); Jeremy Matthew Sage, Acton, MA (US); Kai Makoto Hudek, Hyattsville, MD (US); Yunseong Nam, North Bethesda, MD (US); Nikodem Grzesiak, Morges (CH); Reinhold Blumel, Middletown, CT (US)

(73) Assignees: IonQ, Inc., College Park, MD (US); Duke University, Durham, NC (US)

( * ) Notice: Subject to any disclaimer, the term of this patent is extended or adjusted under 35 U.S.C. 154(b) by 667 days.

(21) Appl. No.: 17/890,864

(22) Filed: Aug. 18, 2022

(65) Prior Publication Data
US 2023/0059264 A1 Feb. 23, 2023

Related U.S. Application Data

(60) Provisional application No. 63/260,441, filed on Aug. 19, 2021.

(51) Int. Cl.
H01J 49/42 (2006.01)
H01J 49/00 (2006.01)

(52) U.S. Cl.
CPC ........ *H01J 49/422* (2013.01); *H01J 49/0018* (2013.01)

(58) Field of Classification Search
CPC ............................ H01J 49/422; H01J 49/0018
See application file for complete search history.

(56) References Cited

U.S. PATENT DOCUMENTS

| | | | | |
|---|---|---|---|---|
| 12,217,882 | B2 * | 2/2025 | Goldman | G21K 1/003 |
| 2024/0054376 | A1 * | 2/2024 | Hudek | G21K 1/003 |
| 2024/0054380 | A1 * | 2/2024 | Sage | G02F 1/11 |

OTHER PUBLICATIONS

International Search Report and Written Opinion in PCT/US2022/075213, mailed Oct. 25, 2023, 14 pages.

(Continued)

*Primary Examiner* — Nicole M Ippolito
(74) *Attorney, Agent, or Firm* — ARENTFOX SCHIFF LLP (57) ABSTRACT

The use of multiple ion chains in a single ion trap for quantum information processing (QIP) systems is described. Each chain can have its own set of laser beams with which to implement and operate quantum gates within that chain, where each chain may therefore correspond to a single quantum computing register or core. Operations can be performed in parallel across all of these chains as they can be treated independently from each other. To implement and operate quantum gates between different chains, neighboring chains are merged into a single, larger chain, in which one can perform quantum gates between any of the ions in the larger chain. The combined chains can then be separated again by another shuttling event as needed. To implement and operate quantum gates between ions which do not occupy neighboring chains, swap gates can be used via a sequence of intervening chains.

21 Claims, 7 Drawing Sheets (56) References Cited

OTHER PUBLICATIONS

Kaushal, V., "A shuttling-based trapped-ion quantum processing node," Dissertation, Johannes Gutenburg Universitat, Oct. 31, 2019, 257 pages.
Kim, J., "Advanced Photonics Technology for Trapped Ion Quantum Computing," Proceedings SPIE, Jul. 16, 2021, vol. 11844, 2 pages.
Monroe et al., "Scaling the Ion Trap Quantum Processor," Science, Mar. 8, 2013, vol. 339, No. 6124, pp. 1164-1169.
Figgatt et al., "Parallel Entangling Operations on a Universal Ion Trap Quantum Computer", arXiv:1810.11948v1 [quant-ph], arXiv. org, Cornell University Library, 201 Olin Library Cornell University Ithaca, NY 14853, XP080932698, Oct. 29, 2018, pp. 1-15.
Office Action received for European Patent Application No. 22926316.5, mailed on May 26, 2025, 11 pages.

\* cited by examiner

QUANTUM COMPUTER BASED ON MANIPULATION OF ION CHAINS

PRIORITY

This application claims priority to and the benefit from U.S. Provisional Application No. 63/260,441, filed on Aug. 19, 2021, and titled "Multi-Core Quantum Computer Based on Manipulation of Ion Chains," the contents of which are incorporated herein by reference in their entirety.

TECHNICAL FIELD

Aspects of the present disclosure relate generally to systems and methods for use in the implementation, operation, and/or use of quantum information processing (QIP) systems.

BACKGROUND

Trapped atoms are one of the leading implementations for quantum information processing or quantum computing. Atomic-based qubits may be used as quantum memories, as quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

It is therefore important to develop new techniques that improve the design, fabrication, implementation, control, functionality, and/or use of different QIP systems used as quantum computers or quantum simulators, and particularly for those QIP systems that handle operations based on atomic-based qubits.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

This disclosure describes various aspects of a quantum computer architecture in which multiple ion chains are used in a single ion trap. Each chain can have its own set of laser beams with which to implement and operate quantum gates within that chain, where each chain may therefore correspond to a single quantum computing "core." Operations can be performed in parallel across all of these chains as they can be treated independently from each other. To implement and operate quantum gates between different chains, neighboring chains are merged into a single, larger chain, in which one can perform quantum gates between any of the ions in the larger chain. This merging of separate chains may be accomplished by, for example, changing the voltage waveforms that are applied to the ion trap, a process referred to as shuttling. The combined chains can then be separated again by another shuttling event as needed. To implement and operate quantum gates between ions which do not occupy neighboring chains, swap gates can be used via a sequence of intervening chains. Alternatively, the ion trap may be configured in such a way to allow rearranging the order of the chains. In either option, moving between different configurations of the ion chains allows for arbitrary quantum computations or operations across all the ions in all the chains.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings or figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well known components are shown in block diagram form, while some blocks may be representative of one or more well known components.

In quantum computers or QIP systems that use qubits based on trapped atomic ions, the approach used for quantum computing is to drive gates between ions within a chain of ions. This is accomplished by using the ion chain's vibrational modes of motion. The number of qubits available for quantum computing can be increased by simply increasing the number of ions in the chain. However, as ions are added to the chain, the center of mass (COM) axial mode frequency of the ion chain goes down. As its frequency goes down, the heating rate of the COM mode goes up, degrading gate fidelity, and thereby degrading the performance of the quantum computer. This problem can be mitigated by reducing the intrinsic heating rate of the ion trap that is used to confine the ions in the chain, and by increasing the mode frequencies of the ion chain by increasing the confinement of the ion trap. However, even with these techniques, there will ultimately be a limit to the number of ions that can be used in a single chain without degrading gate fidelity.

A solution may be a multi-chain approach, in which multiple independent chains are used together with a mechanism for performing gates between different chains. This may be accomplished in a few, different ways. One way is to use photonic interconnects where two ion chains are entangled remotely via emitted photons. This approach is promising for long term, large scaling, but comes with significant technical overhead and challenges. Another way is to store all ions independently and using dynamic voltage waveforms on the ion trap (shuttling) to move any pair of ions together to implement and operate a quantum gate. This approach incurs significant technical complexity due to the numerous shuttling sequences necessary.

In this disclosure, a different approach is proposed in which a quantum computer uses multiple ion chains stored in a single ion trap. Each chain can have its own set of laser beams with which to implement and operate quantum gates within that chain, where each chain may therefore correspond to a single quantum computing "core." Operations can be performed in parallel across all of these chains as they can be treated independently from each other. To implement and operate quantum gates between different chains, neighboring chains are merged into a single, larger chain, in which one can perform quantum gates between any of the ions in the larger chain. This merging of separate chains may be accomplished by, for example, changing the voltage waveforms that are applied to the ion trap, a process referred to as shuttling. The combined chains can then be separated again by another shuttling event as needed. To implement and operate quantum gates between ions which do not occupy neighboring chains, swap gates can be used via a sequence of intervening chains. Alternatively, the ion trap may be configured in such a way to allow rearranging the order of the chains. In either option, moving between different configurations of the ion chains allows for arbitrary quantum computations or operations across all the ions in all the chains.

Solutions to the issues described above are explained in more detail in connection with FIGS. 1A-5, with FIGS. 1A-3 providing a background of QIP systems or quantum computers, and more specifically, of atomic-based QIP systems or quantum computers.

Figure 1A:
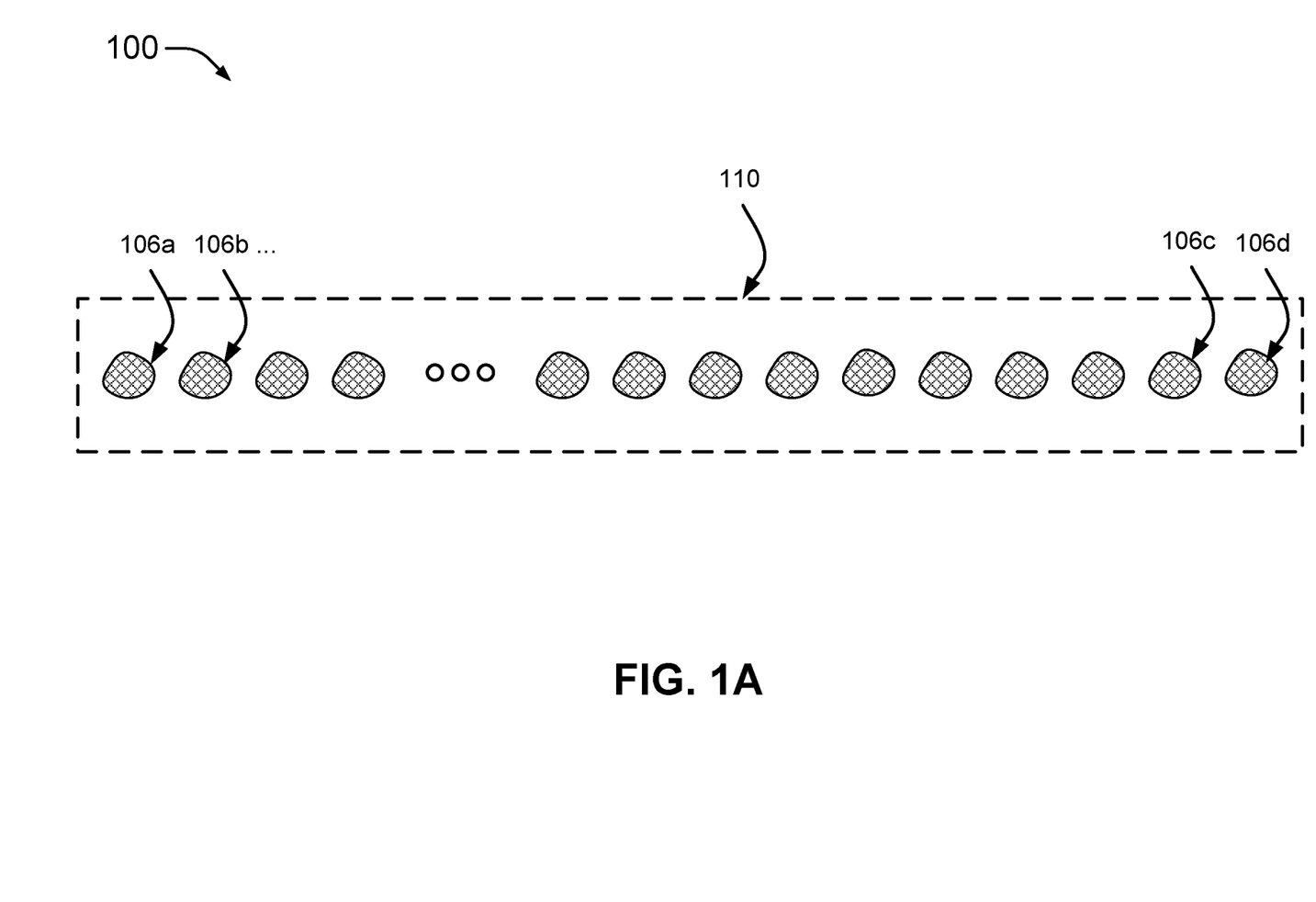
FIG. 1A illustrates a view of atomic ions a linear crystal or chain in accordance with aspects of this disclosure.
Figure 1B:
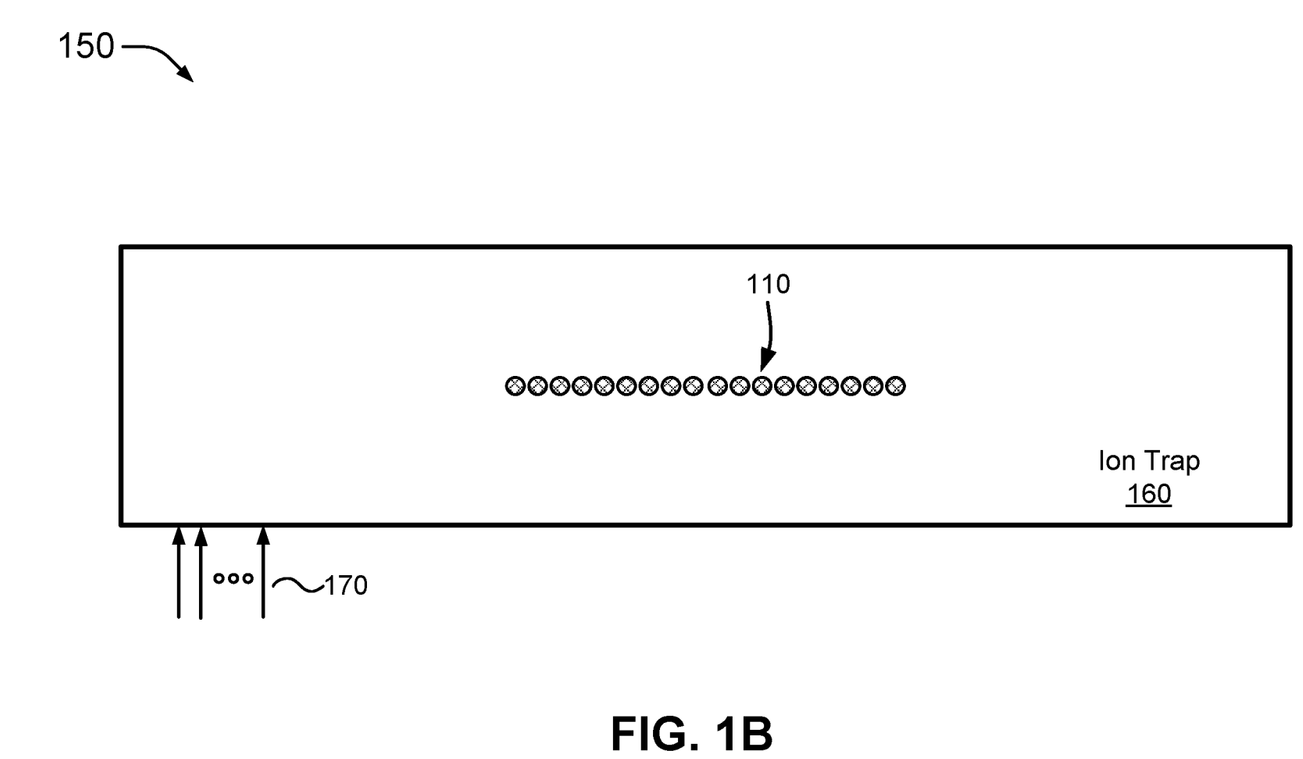
FIG. 1B illustrates a top view of an ion chain formed over an ion trap in accordance with aspects of this disclosure.
Figure 1C:
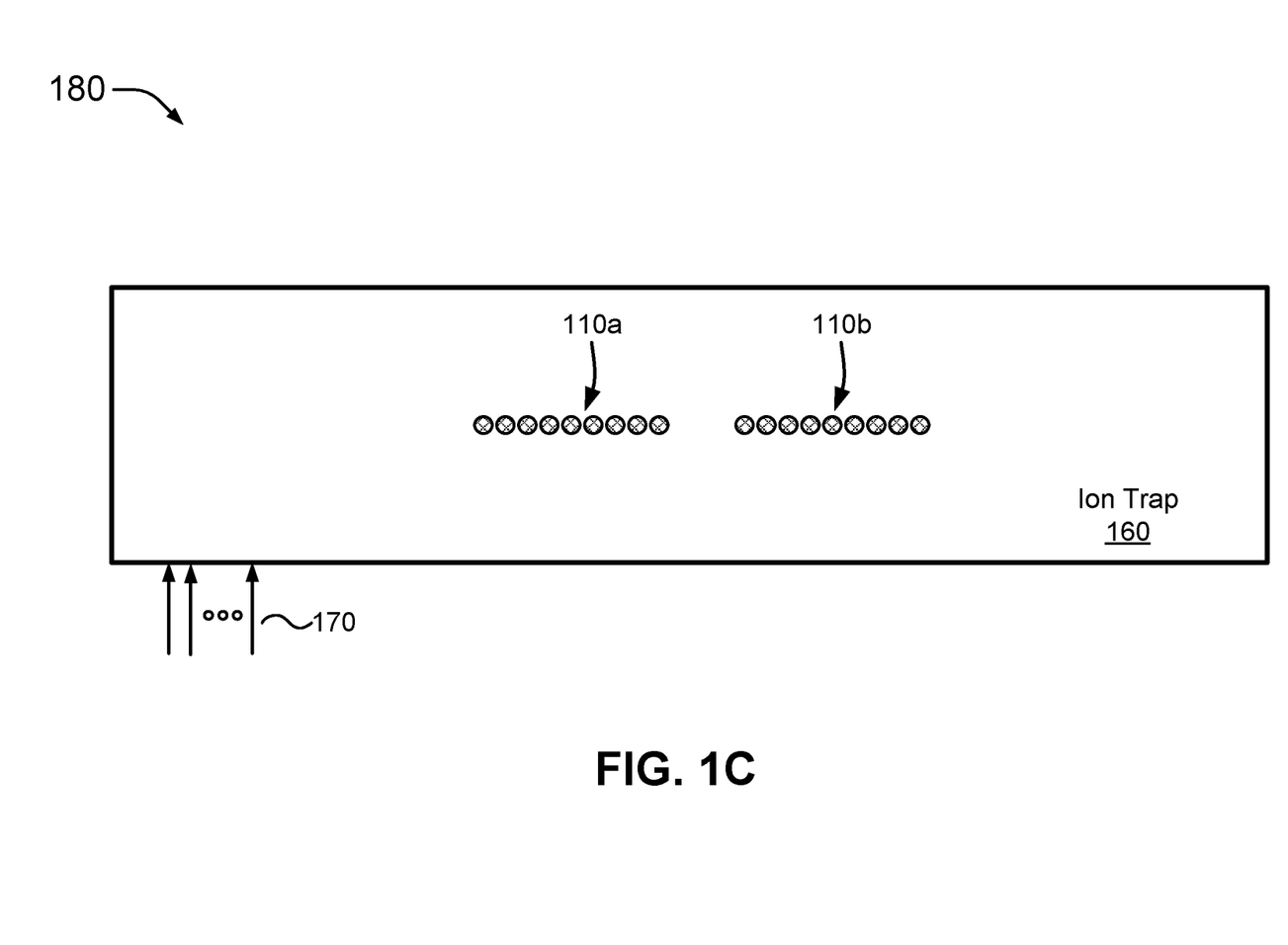
FIG. 1C illustrates a top view of multiple ion chains formed over an ion trap in accordance with aspects of this disclosure.
Figure 2:
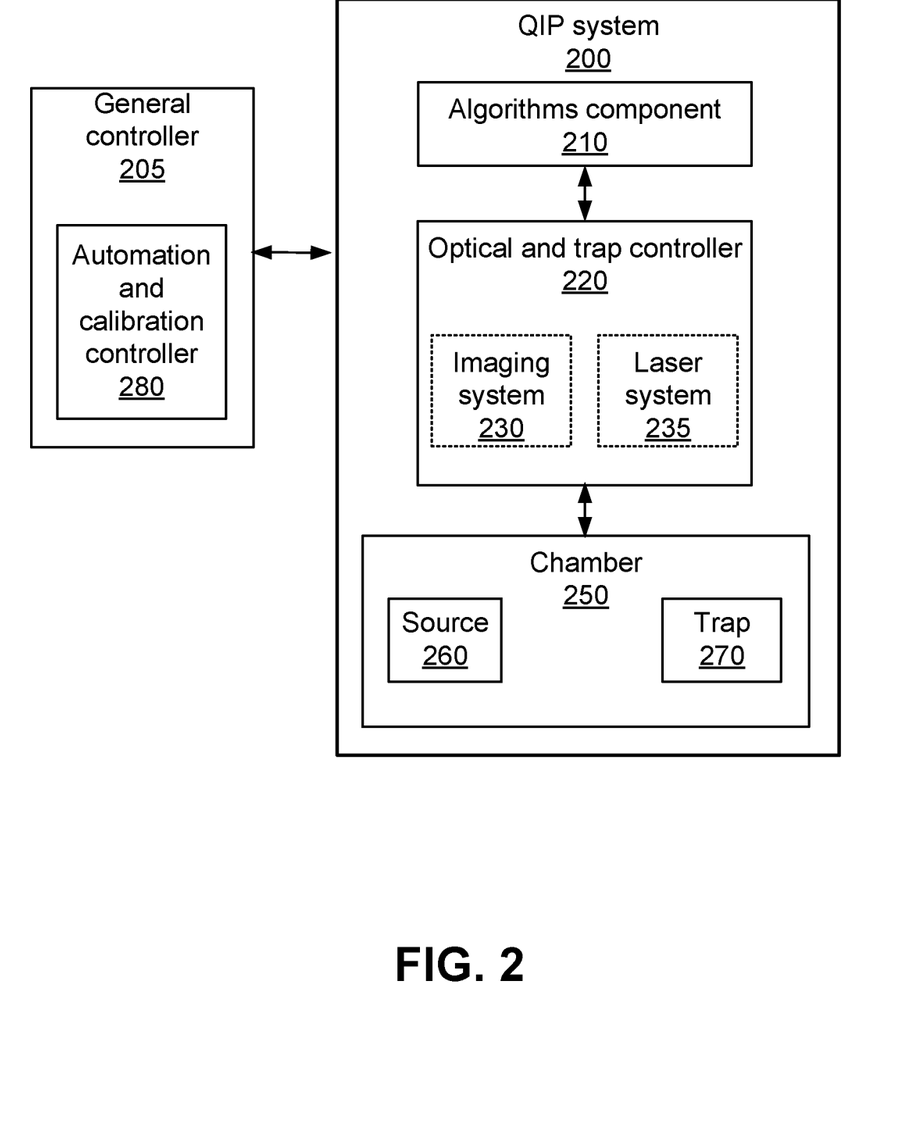
FIG. 2 illustrates an example of a quantum information processing (QIP) system in accordance with aspects of this disclosure.

FIG. 1A illustrates a diagram 100 with multiple atomic ions or ions 106 (e.g., ions 106a, 106b, . . . , 106c, and 106d) trapped in a single linear crystal or chain 110 using a trap (not shown; the trap can be inside a vacuum chamber as shown in FIG. 2). The trap maybe referred to as an ion trap (see e.g., FIGS. 1B and 1C). The ion trap may be built or fabricated on a semiconductor substrate, a dielectric substrate, or a glass die or wafer (also referred to as a glass substrate). The ions 106 may be provided to the trap as atomic species for ionization and confinement into the chain 110. Some or all of the ions 106 may be configured to operate as qubits in a QIP system.

In the example shown in FIG. 1A, the trap includes electrodes (not shown) for trapping or confining multiple ions into the chain 110, which are laser-cooled to be nearly at rest. The number of ions trapped can be configurable and more or fewer ions may be trapped. The ions may be ytterbium ions (e.g., $^{171}Yb^+$ ions), for example. The ions are illuminated with laser (optical) radiation tuned to a resonance in $^{171}Yb^+$ and the fluorescence of the ions is imaged onto a camera or some other type of detection device (e.g., photomultiplier tube or PMT). In this example, ions may be separated by a few microns (μm) from each other, although the separation may vary based on architectural configuration. The separation of the ions is determined by a balance between the external confinement force and Coulomb repulsion and does not need to be uniform. Moreover, in addition to ytterbium ions, barium ions, neutral atoms, Rydberg atoms, or other types of atomic-based qubit technologies may also be used. Moreover, ions of the same species, ions of different species, and/or different isotopes of ions may be used. The trap may be a linear RF Paul trap, but other types of confinement devices may also be used, including optical confinements. Thus, a confinement device may be based on different techniques and may hold ions, neutral atoms, or Rydberg atoms, for example, with an ion trap being one example of such a confinement device. The ion trap may be a surface trap, for example.

FIG. 1B illustrates a diagram 150 that shows a top view of the ion chain 110 over an ion trap 160. The diagram 150 is merely for illustrative purposes and is not intended to be drawn to scale. Also shown in the diagram 150 are signals or voltage waveforms 170 that are applied to the ion trap 160 to control aspects of the operation of the ion trap 160, including aspects of the confinements of the ion chain 110. Not shown are the electrodes in the ion trap 160 to which the signals 170 are applied. The configuration and design of the electrodes along with the configuration of the signals 170 applied to the ion trap 160 may be such that a single ion chain may be formed over the ion trap 160 or multiple, independent ion chains may be formed over the ion trap 160. The latter case is illustrated in a diagram 180 in FIG. 1C in which two separate and independent ion chains (e.g., ion chain 110a and ion chain 110b) are formed over the ion trap 160. Although two ion chains are shown in this example, the number of ion chains formed may be more than two.

FIG. 2 illustrates a block diagram that shows an example of a QIP system 200. The QIP system 200 may also be referred to as a quantum computing system, a quantum computer, a computer device, a trapped ion system, or the like. The QIP system 200 may be part of a hybrid computing system in which the QIP system 200 is used to perform quantum computations and operations and the hybrid computing system also includes a classical computer to perform classical computations and operations. The quantum and classical computations and operations may interact in such a hybrid system.

Shown in FIG. 2 is a general controller 205 configured to perform various control operations of the QIP system 200. These control operations may be performed by an operator, may be automated, or a combination of both. Instructions for at least some of the control operations may be stored in memory (not shown) in the general controller 205 and may be updated over time through a communications interface (not shown). Although the general controller 205 is shown separate from the QIP system 200, the general controller 205 may be integrated with or be part of the QIP system 200. The general controller 205 may include an automation and calibration controller 280 configured to perform various calibration, testing, and automation operations associated with the QIP system 200. These calibration, testing, and automation operations may involve, for example, all or part of an algorithms component 210, all or part of an optical and trap controller 220 and/or all or part of a chamber 250.

The QIP system 200 may include the algorithms component 210 mentioned above, which may operate with other parts of the QIP system 200 to perform or implement quantum algorithms, quantum applications, or quantum operations. The algorithms component 210 may be used to perform or implement a stack or sequence of combinations of single qubit operations and/or multi-qubit operations (e.g., two-qubit operations) as well as extended quantum computations. The algorithms component 210 may also include software tools (e.g., compilers) that facility such performance or implementation. As such, the algorithms component 210 may provide, directly or indirectly, instructions to various components of the QIP system 200 (e.g., to the optical and trap controller 220) to enable the performance or implementation of the quantum algorithms, quantum applications, or quantum operations. The algorithms component 210 may receive information resulting from the performance or implementation of the quantum algorithms, quantum applications, or quantum operations and may process the information and/or transfer the information to another component of the QIP system 200 or to another device (e.g., an external device connected to the QIP system 200) for further processing.

The QIP system 200 may include the optical and trap controller 220 mentioned above, which controls various aspects of a trap 270 in the chamber 250, including the generation of signals to control the trap 270. The optical and trap controller 220 may also control the operation of lasers, optical systems, and optical components that are used to provide the optical lasers or beams that interact with the atoms or ions in the trap. Optical systems that include multiple components may be referred to as optical assemblies. The optical beams are used to set up the ions, to perform or implement quantum algorithms, quantum applications, or quantum operations with the ions, and to read results from the ions. Control of the operations of laser, optical systems, and optical components may include dynamically changing operational parameters and/or configurations, including controlling positioning using motorized mounts or holders. When used to confine or trap ions, the trap 270 may be referred to as an ion trap. The trap 270, however, may also be used to trap neutral atoms, Rydberg atoms, and other types of atomic-based qubits. The lasers, optical systems, and optical components can be at least partially located in the optical and trap controller 220, an imaging system 230, a laser system 235, and/or in the chamber 250. The laser system 235 may include one or more lasers that are used to interact with the atoms or ions in the trap.

The QIP system 200 may include the imaging system 230. The imaging system 230 may include a high-resolution imager (e.g., CCD camera) or other type of detection device (e.g., PMT) for monitoring the ions while they are being provided to the trap 270 and/or after they have been provided to the trap 270 (e.g., to read results). In an aspect, the imaging system 230 can be implemented separate from the optical and trap controller 220, however, the use of fluorescence to detect, identify, and label ions using image processing algorithms may need to be coordinated with the optical and trap controller 220.

In addition to the components described above, the QIP system 200 can include a source 260 that provides atomic species (e.g., a plume or flux of neutral atoms) to the chamber 250 having the trap 270. When atomic ions are the basis of the quantum operations, that trap 270 confines the atomic species once ionized (e.g., photoionized). The trap 270 may be part of what may be referred to as a processor or processing portion of the QIP system 200. That is, the trap 270 may be considered at the core of the processing operations of the QIP system 200 since it holds the atomic-based qubits that are used to perform or implement the quantum operations or simulations. At least a portion of the source 260 may be implemented separate from the chamber 250.

It is to be understood that the various components of the QIP system 200 described in FIG. 2 are described at a high-level for ease of understanding. Such components may include one or more sub-components, the details of which may be provided below as needed to better understand certain aspects of this disclosure.

Aspects of this disclosure may be implemented at least partially using the trap 270, which is controlled by the optical and trap controller 220.

Figure 3:
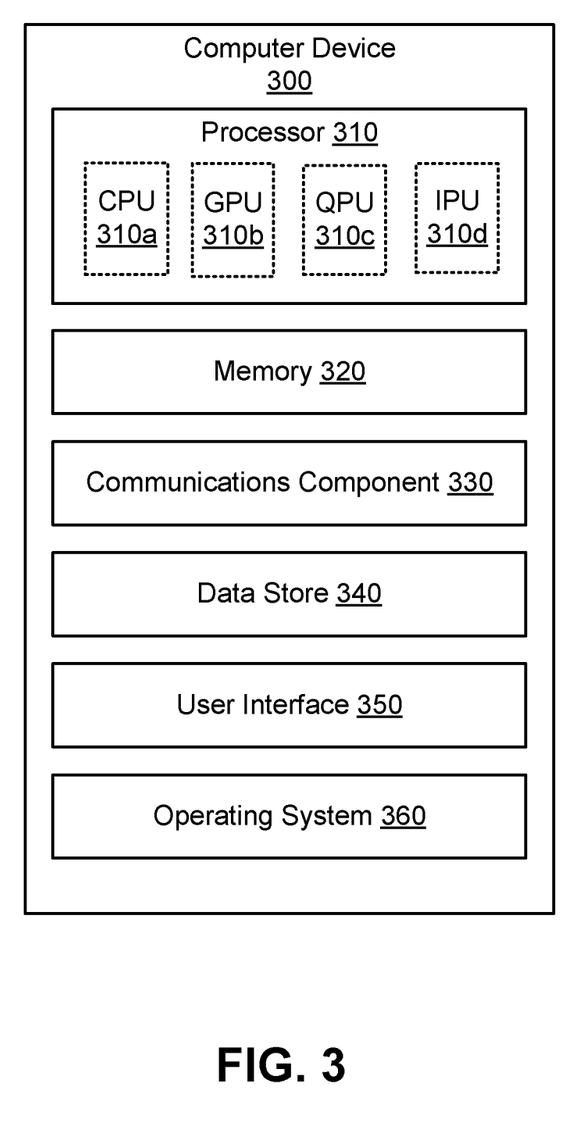
FIG. 3 illustrates an example of a computer device in accordance with aspects of this disclosure.

Referring now to FIG. 3, an example of a computer system or device 300 is shown. The computer device 300 may represent a single computing device, multiple computing devices, or a distributed computing system, for example. The computer device 300 may be configured as a quantum computer (e.g., a QIP system), a classical computer, or to perform a combination of quantum and classical computing functions, sometimes referred to as hybrid functions or operations. For example, the computer device 300 may be used to process information using quantum algorithms, classical computer data processing operations, or a combination of both. In some instances, results from one set of operations (e.g., quantum algorithms) are shared with another set of operations (e.g., classical computer data processing). A generic example of the computer device 300 implemented as a QIP system capable of performing quantum computations and simulations is, for example, the QIP system 200 shown in FIG. 2.

The computer device 300 may include a processor 310 for carrying out processing functions associated with one or more of the features described herein. The processor 310 may include a single processor, multiple set of processors, or one or more multi-core processors. Moreover, the processor 310 may be implemented as an integrated processing system and/or a distributed processing system. The processor 310 may include one or more central processing units (CPUs) 310*a*, one or more graphics processing units (GPUs) 310*b*, one or more quantum processing units (QPUs) 310*c*, one or more intelligence processing units (IPUs) 310*d* (e.g., artificial intelligence or AI processors), or a combination of some or all those types of processors. In one aspect, the processor 310 may refer to a general processor of the computer device 300, which may also include additional processors 310 to perform more specific functions (e.g., including functions to control the operation of the computer device 300). Quantum operations may be performed by the QPUs 310*c*. Some or all of the QPUs 310*c* may use atomic-based qubits, however, it is possible that different QPUs are based on different qubit technologies. When a QPU 310*c* uses ions as qubits, it may include an ion trap that supports multiple ion chains as described herein.

The computer device 300 may include a memory 320 for storing instructions executable by the processor 310 to carry out operations. The memory 320 may also store data for processing by the processor 310 and/or data resulting from processing by the processor 310. In an implementation, for example, the memory 320 may correspond to a computer-readable storage medium that stores code or instructions to perform one or more functions or operations. Just like the processor 310, the memory 320 may refer to a general memory of the computer device 300, which may also include additional memories 320 to store instructions and/or data for more specific functions.

It is to be understood that the processor 310 and the memory 320 may be used in connection with different operations including but not limited to computations, calculations, simulations, controls, calibrations, system management, and other operations of the computer device 300, including any methods or processes described herein.

Further, the computer device 300 may include a communications component 330 that provides for establishing and maintaining communications with one or more parties utilizing hardware, software, and services. The communications component 330 may also be used to carry communications between components on the computer device 300, as well as between the computer device 300 and external devices, such as devices located across a communications network and/or devices serially or locally connected to computer device 300. For example, the communications component 330 may include one or more buses, and may further include transmit chain components and receive chain components associated with a transmitter and receiver, respectively, operable for interfacing with external devices. The communications component 330 may be used to receive updated information for the operation or functionality of the computer device 300.

Additionally, the computer device 300 may include a data store 340, which can be any suitable combination of hardware and/or software, which provides for mass storage of information, databases, and programs employed in connection with the operation of the computer device 300 and/or any methods or processes described herein. For example, the data store 340 may be a data repository for operating system 360 (e.g., classical OS, or quantum OS, or both). In one implementation, the data store 340 may include the memory 320. In an implementation, the processor 310 may execute the operating system 360 and/or applications or programs, and the memory 320 or the data store 340 may store them.

The computer device 300 may also include a user interface component 350 configured to receive inputs from a user of the computer device 300 and further configured to generate outputs for presentation to the user or to provide to a different system (directly or indirectly). The user interface component 350 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 350 may include one or more output devices, including but not limited to a display, a speaker, a haptic feedback mechanism, a printer, any other mechanism capable of presenting an output to a user, or any combination thereof. In an implementation, the user interface component 350 may transmit and/or receive messages corresponding to the operation of the operating system 360. When the computer device 300 is implemented as part of a cloud-based infrastructure solution, the user interface component 350 may be used to allow a user of the cloud-based infrastructure solution to remotely interact with the computer device 300.

In connection with the systems described in FIGS. 1A-3, this disclosure describes an approach in which a quantum computer or QIP system uses multiple ion chains stored in a single ion trap, where each ion chain can have its own set of laser beams with which to implement and operate quantum gates within that ion chain, and where each ion chain may therefore correspond to a single quantum computing core. As such, the terms ion chain and core may be used interchangeably in connection As described above, a single ion trap may be configured and operated to support the confinement of ions into two or more ion chains (see e.g., FIG. 1C). This allows for each of the ion chains to be treated independently as a quantum processing register or core and enable parallel quantum operations to be concurrently and separately performed on two or more of these ion chains. To implement and operate quantum operations between ion chains, neighboring ion chains may be merged or combined into a single, larger ion chain. It is then possible to, for example, perform quantum gates between any of the ions in the larger chain, including between ions that were originally in the separate ion chains. This merging may be accomplished by changing the voltage waveforms on the ion trap (shuttling) such that the ion chains are moved to be physically close to or adjoining each other. Shuttling an ion chain during an algorithm or a quantum computation, however, introduces a complication in that the shuttling tends to heat the ion chain. Therefore, a mechanism must be provided to re-cool the ion chain without disturbing the qubits (e.g., ions in the chain used for operations). This is done via sympathetic cooling, in which some ions in the chain are used as coolant ions instead of being used as qubits. The cooling process should not disturb the qubits, so the coolant ions must either be a different species of ion from that of the qubits, or the same ion species in a state decoupled from the qubit states.

Figure 4:
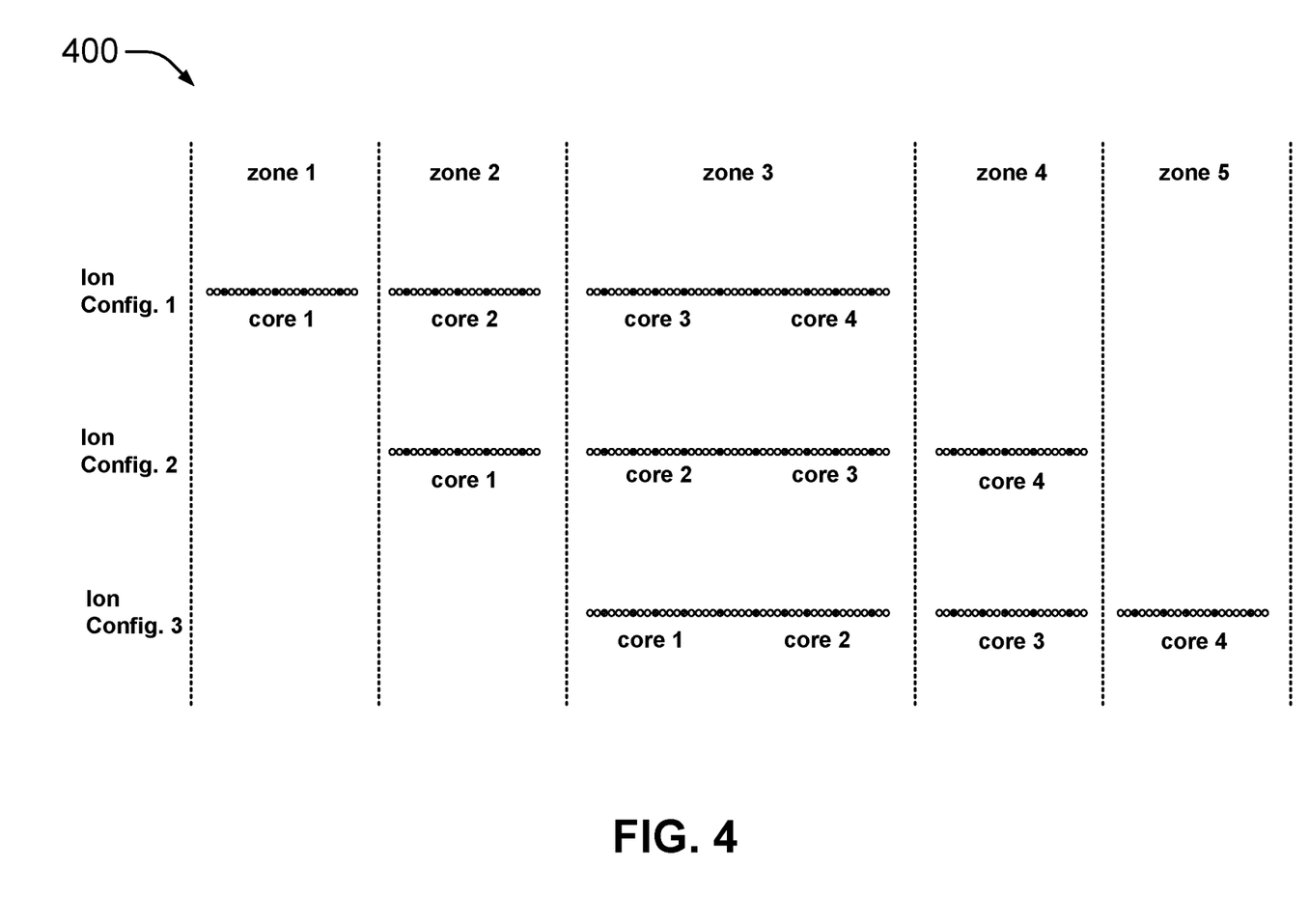
FIG. 4 illustrates an example of a quantum computer architecture with multiple ion chains in accordance with aspects of this disclosure.

FIG. 4 shows a diagram 400 that illustrates an example of a quantum computer architecture that supports shuttling and a re-cooling process when using multiple ion chains formed on a single ion trap. In this example, there is shown a set of four (4) ion chains (e.g., the chain 110 in FIG. 1A, with quantum gates possible within each chain) that are referred to as cores and that may be formed on a single ion trap. Each ion chain or core in this example consists of a chain with 21 ions, of which 16 ions are used as qubits (depicted as white circles) for quantum computations and operations (e.g., for quantum gate formation), and 5 ions are used as sympathetic coolants or coolant ions (depicted as dark circles). Thus, the diagram 400 illustrates a quantum computer with 64 qubits (e.g., 4 cores×21 qubits/core=64 qubits). At any given time, two of the ion chains may be merged or combined into a larger 42-ion chain. In this larger ion chain quantum gates may be performed between any ions, including between ions that were originally in different ion chains. By moving the ion chains within the ion trap using shuttling, the set of four cores can be shuttled between different zones and ion configurations as shown in the diagram 400. In this example, there are five (5) different zones (e.g., zone 1, zone 2, zone 3, zone 4, and zone 5) and three (3) different ion configurations (Ion Config. 1 at the top of the diagram, Ion Config. 2 in the middle of the diagram, and Ion Config. 3 at the bottom of the diagram). The zones represents areas or regions on the ion trap where the cores may be positioned at different times. In this example, zone 1 is the leftmost region in which a single core may be positioned. Zone 2 is to the right of zone 1 and also supports a single core. Zone 3 is the middle zone and supports the presence of 2 cores that are merged for operations. Zones 4 and 5 are to the right of zone 3 and each supports a single core.

In Ion Config. 1, core 1 is in zone 1, core 2 is in zone 2, cores 3 and 4 have been merged and are in zone 3, and there are no cores in zones 4 and 5.

In Ion Config. 2, where the cores have been moved or shuttled to the right by one zone, there is no core in zone 1, core 1 is in zone 2, cores 2 and 3 have been merged and are in zone 3, core 4 is now in zone 4, and there is no core in zone 5.

In Ion Config. 2, where the cores have been moved or shuttled to the right again by one zone, the are no cores in zones 1 and 2, cores 1 and 2 have been merged and are in zone 3, core 3 is now in zone 4, and core 4 is now in zone 5.

It is to be understood that the number of zones and the number of cores provided in the example described above need not be so limited. That is, there may be more or fewer zones, or more or fewer cores than as depicted in the diagram 400. Moreover, the shuttling of cores need not occur in just one direction (e.g., to the right) but may happen in both directions (e.g., to the right and/or to the left) depending on which cores need to be merged. As such, it may be possible to transition from Ion Config. 1 to Ion Config. 2 and then to Ion Config. 3, while it may also be possible to transition from Ion Config. 3 to Ion Config. 2 and then to Ion Config. 1.

During the course of performing an algorithm or quantum operation (e.g., a quantum computation, a quantum simulation), transitions may be made between the different ion configurations described above to allow for arbitrary operations. For example, while neighboring ion chains may be merged to allow quantum gates to be implemented and operated between ions (e.g., qubits as opposed to sympathetic coolants) from different ion chains, swap gates may be needed for non-neighboring ion chains. Therefore, while neighboring cores such as cores 1 and 2, cores 2 and 3, and cores 3 and 4 may be merged to implement and operate quantum gates based on ions from both cores, in order to implement and operate quantum gates between ions in non-neighboring cores such as cores 1 and 3, cores 1 and 4, and cores 2 and 4, swap gates may be needed.

An example of the use of swap gates based on the architecture shown in the diagram 400 is described next. There may be a need to form a quantum gate between an ion (e.g., ion A) in core 2 and an ion (e.g., ion B) in core 4, where cores 2 and 4 are non-neighboring cores. In such a case, the quantum gate may be formed or implemented with the following steps: (1) Shuttle or move the cores to the respective zones until the Ion Config. 2 is implemented. In this configuration, core 1 is in zone 2, cores 2 and 3 are in zone 3, and core 4 is in zone 4. (2) Perform a quantum gate between ion A in core 2 and an ion (e.g., ion C) in neighboring core 3, which is also in zone 3. This is possible because cores 2 and 3 are merged into a single, larger chain. (3) Shuttle or move the cores from Ion Config. 2 to Ion Config. 1. In this configuration, core 1 is in zone 1, core 2 is in zone 2, and cores 3 and 4 are now in zone 3. (4) Perform a quantum gate between ion C in core 3 and ion B in core 4. Again, this is possible because cores 3 and 4 are merged into a single, larger chain. This combination of steps essentially performs the implementation and operation of a quantum gate between ion A in core 2 and ion B in core 4, with an intermediate swap gate between ion A in core 2 and ion C in core 3.

For the Ion Config. 1, an alternative configuration may be to have the two ion chains or cores on the left (e.g., cores 1 and 2) combined to make a longer ion chain like the ion chain in zone 3. Similarly, for the Ion Config. 3, an alternative configuration may be to have the two ion chains or cores on the right (e.g., cores 3 and 4) combined to make a longer ion chain like the ion chain in zone 3.

Note that at least the following features of the proposed architecture for multiple ion chains described herein are fully configurable: (1) The number of ion chains or cores is configurable and may be dynamically adjusted, that is, it may be increased or decreased at different times in the operation of the ion trap. (2) The number of sympathetic coolants in each core is configurable and need not be the same for all cores. (3) The number of gate laser beams (see e.g., FIG. 5) that are used in a zone in connection with the implementation and operation of quantum gates in a core in that zone may be configurable and need not be the same for all zones. Additionally, it may be the case that the number of ions in the different ion chains need not be the same.

The diagram 400 in FIG. 4 shows multiple ion chains or cores moving or being shuttled along a common axis. In this regard, one or more of the ion chains or cores may be moved in one direction and, subsequently, one or more of the ion chains or cores may be moved in a different direction. It may be possible, however, to configure the system to allow different ion chains or cores to move in opposite directions along the common axis at the same time.

One of the benefits of the quantum computer architecture described herein is that operations can be performed in parallel on the multiple ion chains. The ability to perform parallel operations is at least partially based on the number of gate lasers beams built into the system that may be applied to the ion chains. As an example, if counterpropagating, movable laser beams are provided in every zone, then it is possible to implement and operate quantum gates in all of the ion chains in parallel (or in as many of the ion chains as needed). An example of this quantum gate parallelism is illustrated in a diagram 500 in FIG. 5.

Figure 5:
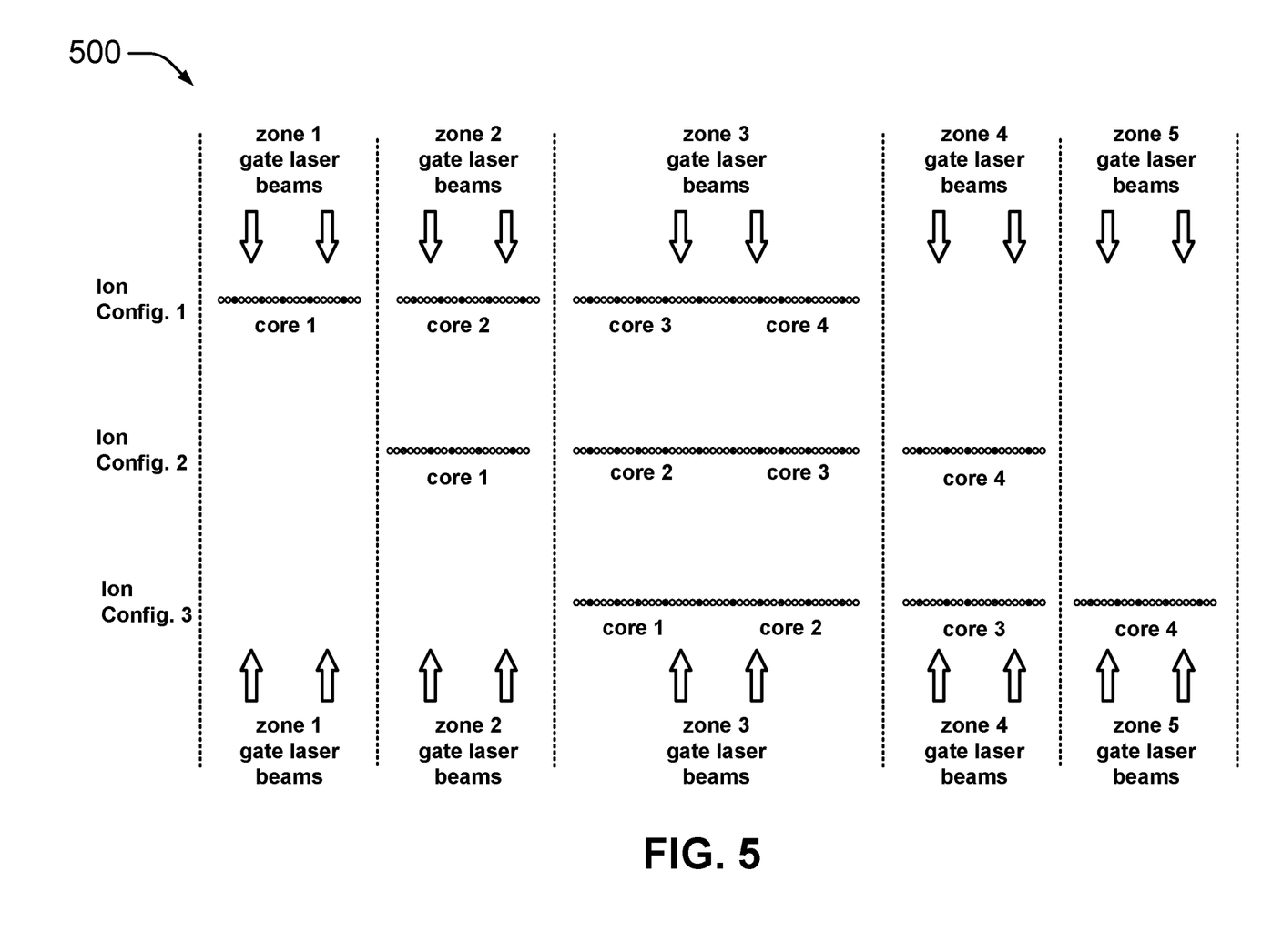
FIG. 5 illustrates an example of parallel gate implementation using the quantum computer architecture of FIG. 4 in accordance with aspects of this disclosure.

For illustrative purposes, the diagram 500 shows the same ion configurations as shown in the diagram 400 in FIG. 4. Associated with each zone, there are shown four (4) gate laser beams that can be directed to target any pair of ions in an ion chain in the zone. For example, there may be two pairs of counterpropagating gate lasers in a zone, with a first pair of gate laser beams targeting a first ion in the pair of ions and a second pair of gate laser beams targeting a second in in the pair of ions. These gate laser beams may be used to implement and operate, for example, quantum gates (e.g., one-qubit gates or two-qubit gates). Thus, by allowing a set of at least four gate laser beams in each zone, or at least in a number of zones, it is possible to perform parallel operations in multiple zones at the same time.

When the system is configured such that more than four gate laser beams may be provided in a zone, then parallel operations are possible within the ion chain in the zone. For example, it is possible to have a configuration that supports a separate pair of counterpropagating laser beams for each and every ion in the ion chain in a zone, allowing for maximal parallelism. Alternatively, less than maximal parallelism but more than four gate laser beams in a single zone may also be supported.

In another example, with respect to zone 3 in the diagram 500 in which two cores are merged, it may be the case that the system is configured to support only four gate laser beams for zone 3. This configuration would not allow any parallelism within the long chain in zone 3 since only one gate may be performed at a time.

Moreover, with respect to zone 3 in the diagram 500, the minimum scanning range of the gate laser beams must be such that they can hit all ions in zone 3. It may be the case that the scanning range of the gate laser beams in zone 3 is large enough to address ions in other, adjacent zones. In that case, it may be possible to implement and perform quantum gates between ions in zone 3 and ions in adjacent zones without shuttling to zone 3.

In an alternative terminology, it is possible to call each of the ions chains shown in the diagrams 400 and 500 with a different name. For example, if the quantum operation is to be performed only on a long ion chain, such as the long ion chain formed in zone 3 from the merger of two other ion chains, then the ion chains may be generally referred to as "quantum registers" or simply "registers" and the term "core" may be used instead to refer to the unit or the long ion chain on which the quantum operation is to be performed. In this scenario, two registers or ion chains are combined to realize a "core." The system may be configured to allow registers can move on either side and participate in different cores, which is the way quantum communication is done between cores. In that spirit, and referring back to the diagrams 400 and 500, the two registers or ion chains to the left of zone 3 and to the right of zone 3 may be combined to form other cores. This technique may be referred to as "dynamic quantum cores," as the cores are dynamically formed from different registers in a multi-core architecture. It is possible to also consider scenarios where more than two registers can be combined to create an even larger core, and the registers can be moved around in more complex topologies than a linear chain as described herein.

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A quantum information processing (QIP) system configured to perform quantum operations, the system comprising:
   an ion trap; and
   a controller configured to:
   control a formation of multiple ion chains in the ion trap, and
   generate signals to be applied to the ion trap to shuttle the multiple ion chains between zones in the ion trap to form at least one longer ion chain by merging two or more of the multiple ion chains.

2. The QIP system of claim 1, wherein each of the multiple ion chains includes one or more qubits and one or more coolant ions.

3. The QIP system of claim 2, wherein a number of coolant ions in one of the multiple ion chains is different from a number of coolant ions in another one of the multiple ion chains.

4. The QIP system of claim 2, wherein the one or more qubits are of a different ion species than the one or more coolant ions.

5. The QIP system of claim 2, wherein the one or more qubits are ytterbium ions.

6. The QIP system of claim 2, wherein the one or more qubits are barium ions.

7. The QIP system of claim 1, wherein the signals are voltage waveforms applied to the ion trap.

8. The QIP system of claim 1, wherein each of the multiple ion chains is a linear chain of ions.

9. The QIP system of claim 8, wherein merging two or more of the multiple ion chains includes adjoining ends of two linear chains of ions together.

10. The QIP system claim 8, wherein merging two or more of the multiple ion chains includes adjoining ends of more than two linear chains of ions together.

11. The QIP system of claim 8, wherein merging two or more of the multiple ion chains includes adjoining ends of a pair of linear chains of ions together and adjoining ends of another pair of linear chains of ions together.

12. The QIP system of claim 1, wherein a number of ions in one of the multiple ion chains is different from a number of ions in another one of the multiple ion chains.

13. The QIP system of claim 1, wherein the two or more of the multiple ion chains that are merged are merged in a specified zone or in more than one specified zone.

14. The QIP system of claim 1, further comprising a laser system configured to generate gate laser beams for one or more of the zones in the ion trap.

15. The QIP system of claim 14, wherein a number of gate laser beam for one of the zones is different from a number of gate laser beams for another one of the zones.

16. The QIP system of claim 14, wherein a number of gate laser beams for the one or more of the zones is at least four gate laser beams.

17. The QIP system of claim 14, further comprising an algorithms component configured to perform an algorithm that results in gate laser beams being used to implement quantum gates in two or more of the multiple ion chains in parallel.

18. The QIP system of claim 14, further comprising an algorithms component configured to perform an algorithm that results in gate laser beams being used to implement multiple quantum gates in the at least one larger ion chain in parallel.

19. The QIP system of claim 1, wherein to shuttle the multiple ion chains between the zones in the ion trap includes moving one of the multiple ion chains from the at least one longer ion chain for merging with another one of the multiple ion chains to form a different longer ion chain.

20. The QIP system of claim 1, wherein the controller configured to control the formation of the multiple ion chains in the ion trap is further configured to dynamically change a number of ion chains formed in the ion trap.

21. The QIP system of claim 1, wherein the controller configured to shuttle the multiple ion chains between zones in the ion trap is further configured to move one or more of the multiple ion chains from a current zone into an adjacent zone.

* * * * *